E. L. ANDERSON.
SOFT COLLAR HOLDER.
APPLICATION FILED MAY 8, 1920
1,361,760.
Patented Dec. 7, 1920.
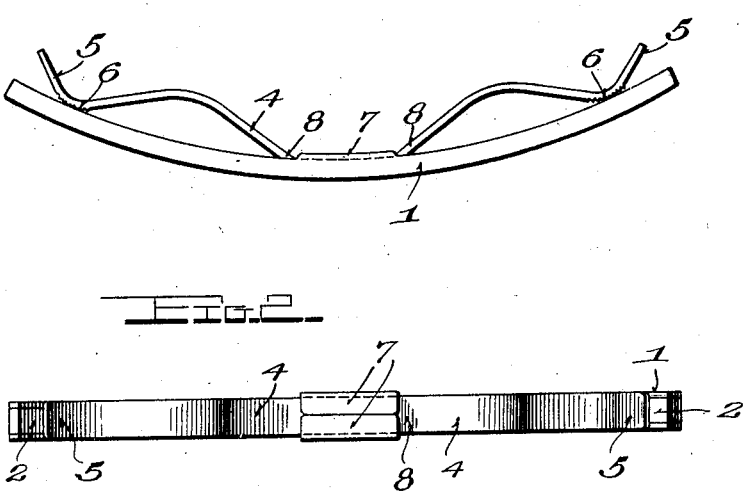

UNITED STATES PATENT OFFICE.

EDWARD L. ANDERSON, OF ATTLEBORO, MASSACHUSETTS, ASSIGNOR TO R. & G. COMPANY, OF ATTLEBORO, MASSACHUSETTS, A CORPORATION OF MASSACHUSETTS.

SOFT-COLLAR HOLDER.

1,361,760.     Specification of Letters Patent.     Patented Dec. 7, 1920.

Application filed May 8, 1920. Serial No. 379,768.

*To all whom it may concern:*

Be it known that I, EDWARD L. ANDERSON, a citizen of the United States, residing at Attleboro, in the county of Bristol and State of Massachusetts, have invented new and useful Improvements in Soft-Collar Holders, of which the following is a specification.

This invention relates to certain new and useful improvements in soft collar holders, and the primary object of the invention is to provide a structure of this kind which involves clamping jaws that are secured in position without the use of solder.

A further object of the invention is to provide a holder of this type which is of simple and economical construction and which involves but two parts in its entire construction.

A still further object of the invention is to provide a holder which will effectively grip the collar ends or points and which will not be subject to slippage or other accidental movement.

Further and other objects will be later set forth and manifested in the course of the following description.

In the drawing:

Figure 1 is a top plan view of the invention:

Fig. 2 is a rear side elevation, and

Fig. 3 is a longitudinal sectional view.

In proceeding in accordance with the present invention a front bar 1 is employed which is slightly curved as shown and which is made of a piece of channeled stock, the sides of the channel at each end being cut off and the ends resultant therefrom, being bent inwardly at 2 to lie parallel with the front of the bar and being finally turned downwardly at 3 so as to close the ends of the channel and to also provide comparatively rigid jaws against which the collar ends are engaged.

A single resilient bar 4 is employed the ends of which are curved to form the spring jaws 5, which latter are roughened or serrated at 6 so as to firmly grip the collar ends in a manner which will prevent slippage or other accidental movement of the device. The jaws 5 are as shown slightly convex at their effective points or faces, and lie opposite to the inclined rigid jaws 3, so that the action of the jaws 5 will be to force the collar ends against the jaws 3 and in the angle formed by the jaws 3 and the rear face of the front bar 1, so that longitudinal movement of the device is practically impossible, except under considerable force.

For the purpose of holding the bar 4 in position, the center of each of the channel sides is drawn up to form an extension or lip 7, which lips are bent inwardly toward each other to engage on top of the center of the bar 4, so as to hold the latter against the rear face of the front bar 1, whereby the bar 4 is frictionally held in place and without the use of solder. The center of the bar 4 is shaped so as to engage in the channel and thereby assist in the rigid and effective securement thereof.

Owing to the bends 8 in the bar 4 which engage the ends of the lips 7, it will be apparent that longitudinal movement of the bar cannot occur.

Having thus described my invention, what I claim as new and desire to secure by Letters Patent is:—

1. In a soft collar holder, a channeled front bar having the sides of its ends cut away and the ends turned inwardly at an angle to the front bar to close the channel ends, lips at the center of the front bar and on opposite sides of the channel thereof, and a resilient bar having a central part engaged in the channel with the lips engaged over the central part of the resilient bar to hold same in the channel, the resilient bar having bends adjacent the ends of the lips, and having curved jaws which are roughened and which lie opposite to the inturned ends of the front bar.

2. In a soft collar holder, a channeled front bar having the sides of its ends cut away and the ends turned inwardly to lie approximately parallel to the body of the bar and having the extremities of the ends turned inwardly at an incline to lie adjacent to the body, and a resilient bar having a central part engaged between the sides of the channel of the front bar and having convex parts which lie opposite to the inclined extremities.

3. In a soft collar holder, a front bar having its ends turned inwardly and having the extremities of its said ends inclined toward the center of the front bar, and a resilient bar secured between its ends to the front bar and having convex jaws at its ends which lie opposite to said inclined ends of the front bar so as to force the collar ends against said inclined ends and also against the rear face of the front bar.

In testimony whereof I have signed my name to this specification in the presence of two subscribing witnesses.

EDWARD L. ANDERSON

Witnesses:
E. P. TOOMEY,
J. A. MILLER.